(12) United States Patent
Dirschl et al.

(10) Patent No.: US 6,306,958 B1
(45) Date of Patent: Oct. 23, 2001

(54) AQUEOUS DISPERSIONS FOR TEXTILE FINISHING

(75) Inventors: Franz Dirschl, Augsburg; Franz Mosch, Diedorf; Wilhelm Artner, Motzenhofen; Edeltraud Schidek, Augsburg; Heinz Gaugenrieder, Zusmarshausen; Simpert Lüdemann, Bobingen; Erich Rössler, Stadtbergen-Leitershofen, all of (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/465,867

(22) Filed: Dec. 16, 1999

(30) Foreign Application Priority Data

Dec. 22, 1998 (EP) .................................................. 98124501

(51) Int. Cl.$^7$ .................................................. C08G 18/80
(52) U.S. Cl. .............................. 524/805; 528/45; 528/70; 528/73; 524/839; 525/124; 525/452; 525/528; 8/115.6; 8/115.64; 8/192
(58) Field of Search .................. 528/45, 73, 70; 524/839, 805; 8/115.6, 192, 115.64; 525/124, 452, 528

(56) References Cited

U.S. PATENT DOCUMENTS

| | | | |
|---|---|---|---|
| 4,310,646 | 1/1982 | Kempter et al. | 525/528 |
| 4,374,031 * | 2/1983 | Kudo et al. | 427/386 |
| 4,761,337 | 8/1988 | Guagliardo et al. | 428/425.8 |
| 4,834,764 | 5/1989 | Deiner et al. | 8/115.64 |
| 4,976,833 | 12/1990 | Debroy et al. | 204/181.7 |
| 5,508,370 | 4/1996 | Reiff et al. | 528/45 |
| 5,693,737 | 12/1997 | Reiff et al. | 528/45 |
| 5,725,789 | 3/1998 | Huber et al. | 252/8.62 |

FOREIGN PATENT DOCUMENTS

| | | |
|---|---|---|
| 0545353 | 6/1993 | (EP) . |
| 0677539 | 10/1995 | (EP) . |
| 0872503 | 10/1998 | (EP) . |

OTHER PUBLICATIONS

Patent Abstracts of Japan Publication No. 09143882 and Derwent Abstr. 1997–348082 [32] for JP 09143882; Mar. 6, 1997.

* cited by examiner

Primary Examiner—Rachel Gorr
(74) Attorney, Agent, or Firm—Kevin T. Mansfield

(57) ABSTRACT

Aqueous dispersions comprising as component A) a compound containing two or more blocked isocyanate groups in the molecule and as component B) a compound obtainable by reacting a diepoxy compound with a diamine or polyamine and subsequently reacting the resulting reaction product with an acid and possibly as component C) a dispersant are suited together with fluorine containing oligomers or polymers for the oil-, water- and soil-repellent finishing of fiber materials.

19 Claims, No Drawings

AQUEOUS DISPERSIONS FOR TEXTILE FINISHING

The invention relates to aqueous dispersions comprising a compound having blocked isocyanate groups in the molecule, to a process for preparing such dispersions and to the use of said dispersions to treat fiber materials.

Aqueous dispersions comprising compounds having blocked isocyanate groups are known and described, for example, in EP-A 196 309, EP-A 262 069, EP-A 537 578, and EP-A 872 503. In connection with the oil and water repellent finishing of fiber materials it is also known to use compounds having blocked isocyanate groups as extenders in combination with perfluoroalkyl-containing polymers in order to intensify the effects of the latter. This utility is described, for example, in EP-A 196 309, EP-A 537 578, and EP-A 872 503.

The prior art aqueous dispersions comprising compounds having blocked isocyanate groups have the disadvantage that when used together with perfluoroalkyl-containing polymers in order to obtain an oil and water repellent finish on cellulosic fiber materials they occasionally result in effects which are less than optimum, especially as regards the permanence of the effects following laundering and dry-cleaning operations.

It is an object of the present invention to provide aqueous dispersions comprising a compound which has blocked isocyanate groups in the molecule and which together with perfluoroalkyl-containing polymers allows an oil and water repellent finish to be obtained on cellulosic fiber materials, especially cotton, with effects which are good and above all permanent.

This object has been achieved by an aqueous dispersion comprising at least two components A) and B), component A) being a compound containing two or more blocked isocyanate groups in the molecule, wherein component B) is a product obtainable by reacting a diepoxy compound of the formula (I)

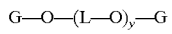
G—O—(L—O)$_y$—G  (I)

or a mixture of compounds of the formula (I) with a diamine or polyamine of the formula (II)

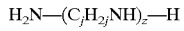
H$_2$N—(C$_j$H$_{2j}$NH)$_z$—H  (II)

or a mixture of compounds of the formula (II) in a proportion such that the molar ratio of the deployed glycidyl radicals G to the hydrogen atoms of the deployed amino groups is in the range from 2:1 to 1:4, preferably in the range from 1:1 to 1:2, with particular preference in the range from 1:1 to 1:1.1, and subsequently reacting the resulting reaction product with an acid in a proportion such that the ratio of moles of nitrogen to equivalents of acid is in the range from 1:0.25 to 1:2, the above radicals and indices independently of one another having the following definitions:

G=glycidyl radical (2,3-epoxy-1-propyl radical)
L=divalent radical of formula (CO)c$_1$—E$_d$—(CO)c$_2$
E=divalent aromatic, aliphatic or araliphatic hydrocarbon radical of 1–18 carbon atoms uninterrupted or interrupted by one or more oxygen atoms; preferably an aliphatic radical of 1–8 carbon atoms or an aromatic radical of 6–24 carbon atoms
c$^1$ and c$^2$ independently of one another=0 or 1
d=0 or 1
and c$^1$, c$^2$ and d are not all simultaneously 0 when y=1
j=0 or 2–10
y=0 or 1
z=1–3; but z=1 if j=0.

The aqueous dispersions of the invention have the following advantages:
1. good mechanical and thermal stability
2. together with even relatively small amounts of known perfluoroalkyl-containing polymers already used for textile finishing they allow an oil and water repellent finish to be obtained on cellulose fiber materials, especially cotton, with good effects including permanence after laundering and dry-cleaning operations
3. good running properties when used in textile finishing.

Components A) suitable for the aqueous dispersions of the invention are, as already mentioned at the outset, known and described for example—with no claim to completeness—in the abovementioned references. Blocked aliphatic, alicyclic or aromatic di-, tri- or polyisocyanates are suitable. The compounds suitable for blocking isocyanate groups are also known to the skilled worker. The compounds suitable as component A) can be obtained inter alia, for example, by simultaneous or successive reaction of one or more di- or polyisocyanates with one or more compounds having functional groups which react with isocyanate groups and subsequent reaction of the remaining free isocyanate groups with known blocking agents, preferably with ketone oximes—examples being acetone oxime or butanone oxime—or mixtures thereof. Further suitable blocking agents are described in the literature. The property common to all suitable blocking agents is that they result in reversible blocking of the isocyanate groups; that is, the blocking agent is bonded chemically to the isocyanate group at room temperature and is cleaved off at elevated temperatures. Aqueous dispersions of compounds A) are also known to the skilled worker.

Components B) present in the aqueous dispersions of the invention are also known per se. They are obtainable by reacting a diepoxy compound of the formula (I)

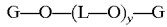
G—O—(L—O)$_y$—G  (I)

or a mixture of compounds of the formula (I) with a diamine or polyamine of formula (II)

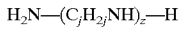
H$_2$N—(C$_j$H$_{2j}$NH)$_z$—H  (II)

or a mixture of compounds of the formula (II) in the stated proportion with cooling and subsequently reacting the resulting reaction product with an acid in the stated proportion, the radicals and indices indicated having the stated definition. Preference is given to compounds B) in which the diepoxy compound used corresponds to the formula G—O—E—O—G; particular preference to those in which E is a divalent aliphatic radical of 2–6 carbon atoms or a divalent aromatic radical of 6–18 carbon atoms, especially the radical p—C$_6$H$_4$—(CH$_3$)C(CH$_3$)—p—C$_6$H$_4$—. Likewise preferred are compounds B) prepared using a diamine of 2–6 carbon atoms, especially hexamethylene diamine. In the preparation of compounds B) the acid used is preferably either an organic acid, especially acetic acid, or a strong inorganic acid, such as sulfuric acid, phosphoric acid and, in particular, hydrochloric acid. However, other acids can also be used. It is advantageous for the acid to be added rapidly.

The dispersions of the invention can be obtained by mixing a dispersion of a compound A) with a solution of a compound B). Preferred, however, are dispersions of the invention prepared by jointly dispersing components A) and B) with the aid, for example, of a high-speed stirrer; particularly preferred dispersions of the invention are those which following the dispersing operation are converted into fine dispersions by homogenization. The homogenization can be carried out, for example, with a high-pressure homogenizer machine (e.g., from the manufacturer Manton-Gaulin) at a pressure of from 100 to 500 bar, preferably from 200 to 300 bar. When dispersed individually, or in the case of the stated preferred joint dispersing operation, components A) are preferably used in the form of solutions in organic solvents. Examples of suitable solvents are esters, ketones, alcohols, aromatic hydrocarbons, mono-, di-, tri- and tetraglycols of ethylene glycol or propylene glycol and also the alkyl ethers thereof or the esters thereof. Not only dispersing and, if desired, mixing, but also high-pressure homogenizing, can be carried out at normal or elevated temperature. Excessively low temperatures carry with them the risk of a precipitation of product from the dispersion; the upper temperature limit is determined by the boiling point of the water/solvent mixture. It is preferred to operate at 20–40° C.; high-pressure homogenization is judiciously conducted with cooling. After the dispersion comprising components A) and B) has been obtained, it is preferred to remove any organic solvent present, by means, for example, of distillation, under either atmospheric or reduced pressure. The solvent-free aqueous dispersions obtained in this way feature the advantages not only of eco-friendliness and a high flash point but also of increased stability.

The dispersions of the invention comprise components A) and B) advantageously in a weight ratio from 100:2.5 to 100:30, preferably from 100:5 to 100:15. Their water content can be variable within a broad range and is guided by the preparation conditions, the stability requirements and the way in which they are to be used.

The dispersions of the invention possibly further comprise one or more dispersants as component C). Nonionic or cationic dispersants are highly suitable, examples being alkoxylates of fatty alcohols, fatty acids and sorbitan esters, alkylpolyglycosides, alkoxylated and possibly quaternized amines, and tetraalkylammonium salts. Particularly suitable are cationic or pseudocationic dispersants of the formula (III) or (IV)

$$[R^4{}_aR^5{}_bNR^6{}_{(4-a-b)}]_pX \quad \text{(III)}$$

$$R^4R^5N-C_kH_{2k}-NR^4{}_2 \quad \text{(IV)}$$

where the radicals and indices indicated have independently of one another the following definitions:
$R^4=(C_mH_{2m}O)t-R^3$
$R^3$=hydrogen or linear or branched alkyl group of 1–6 carbon atoms
$R^5$=linear alkyl or alkenyl radical of 8–24 carbon atoms
$R^6$=hydrogen, methyl or ethyl
a=0, 1 or 2
b=1 or 2
k=2–6
m=2–4
p=valence of X
t=1–20, preferably 5–10
X=anion, preferably $R^1COO^-$, $CH_3SO_4^-$, $SO_4^{2-}$, halide ion, especially $Cl^-$ Where components A) and B) are dispersed jointly, component C) is preferably used at the same time as well in the dispersing operation.

The dispersions of the invention comprise components A) and C) advantageously in a weight ratio of from 100:1 to 100:20, preferably from 100:1 to 100:5.

In addition to components A), B) and, if present, C) the dispersions of the invention preferably further comprise a perfluoroalkyl-containing oligomer, homo-polymer or copolymer as component D). Perfluoroalkyl-containing oligomers, homopolymers and copolymers are known to the skilled worker. Examples that may be mentioned include perfluoroalkyl-containing acrylic polymers and polyurethanes. Suitable perfluoroalkyl-containing copolymers also include those composed of two or more monomers some of which are free from fluorine. Preferred candidates are oligomers, homopolymers and copolymers based on acrylates or methacrylates having perfluoroalkyl groups. Highly suitable examples are copolymers composed of perfluoroalkylethyl acrylate, vinylidene chloride and stearyl methacrylate, with a weight ratio of the monomers of approximately 4:1:1.

Dispersions of the invention comprising components A), B) and, if present, C) and D) are prepared preferably by mixing a dispersion containing components A) and B) and possibly C) with a dispersion containing component D) and possibly C) and also further components. Component B) can also be used in the preparation of the dispersion of component D), alone or together with component C). Dispersions obtained by mixing a fluorine-free aqueous dispersion comprising components A), B) and, if present, C) with an aqueous dispersion comprising components B), D) and, if present, C) are likewise highly suitable as dispersions of the invention.

A preferred candidate as component D) is a perfluoroalkyl-containing copolymer composed essentially of a monomer a):

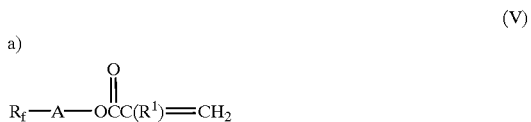

(V)

and one or more of the monomers b) and c):

(VI)

(VII)

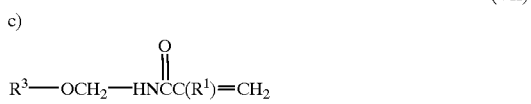

where the radicals and indices indicated have independently of one another the following definitions:
A=linear or branched divalent radical of the formula $-C_nH_{2n}-$, $-C_nH_{2n-2}-$ or $-S(O_2)-NR^3-C_mH_{2m}-$, the sulfur atom being attached to $R_f$
$R_f$=perfluoroalkyl radical of 4–20 carbon atoms
$R^1$=hydrogen or methyl
$R^2$=linear alkyl or alkenyl radical of 1–24, preferably 4–24, carbon atoms
$R^3$=hydrogen or, preferably, linear or branched alkyl group of 1–6 carbon atoms
m=2–4
n=1–4.

The monomers of the formula (V) can also comprise mixtures having different radicals $R_f$. The monomers are preferably present in a weight ratio (V):(VI):(VII) of 20–99%:1–30%:0–20%.

The dispersions of the invention comprise components A) and, D) advantageously in a weight ratio of from 100:40 to 100:1500, preferably from 100:80 to 100:250.

The dispersions of the invention are highly suited to the treatment of fiber materials, especially for treating woven or knitted textile sheetlike structures. Suitable materials include both fiber materials of natural and of regenerated cellulose, preferably cotton, and fibers of animal origin, preferably wool, and also fiber materials of synthetic organic fibers, such as polyester fibers, for example, and mixtures thereof. If desired, it is possible in addition to use further products suitable for textile finishing, such as, for example, cellulose crosslinkers, soft-hand agents, silicone elastomers and flame retardants, preferably by adding these products to the dispersion of the invention. Suitable products for such additional use are known to the skilled worker. Examples that may be cited include: ethyleneurea derivatives as cellulose crosslinkers, dispersions containing silicone and/or modified polyethylene as soft-hand agents, and phosphorus products for the flame retardant finish. The compositions of the invention comprising components A), B), if present C) and D) are suitable preferably for use for the oil, water and dirt repellent finishing of fiber materials. The fiber materials finished with the dispersions of the invention feature good oil, water and dirt repellency effects, these effects showing good permanence after laundering and dry-cleaning operations and, in a number of cases, being capable of further improvement by ironing the fiber materials after the laundering and dry-cleaning operations.

The dispersions of the invention can be applied to fiber materials by the customary methods known to the skilled worker, such as padding (nip or slop), coating, spraying, exhaust techniques, etc. Particular preference is given to application using a pad mangle. The judicious concentrations to be established can be readily determined by the skilled worker. The fiber materials treated in this way are completed in a customary manner—by drying, for example.

The invention is illustrated below by means of practical examples. All of the examples use the same cotton twill. In assessing the results, the test methods described below were used. Before the tests were carried out, the finished fabric samples were stored for 24 hours at 20° C./65% relative humidity.

The oil repellency was determined in accordance with AATCC 118-1997. Here, wetting by 8 different liquid hydrocarbons was tested; the evaluation scale for this test method encompasses ratings from 1 to 8, rating 8 being the best (greatest repellence).

The water repellency was determined in accordance with both AATCC 22-1996 (spray test) and DIN 53888 (Bundesmann shower test). In the DIN test the water bead effect is assessed visually (three times for each fabric, i.e., after 1, 5 and 10 minutes of showering), with ratings from 1 (worst) to 5 (best: water beads without wetting) being awarded, after which the water absorption in % by weight is determined. The spray test likewise involves a visual assessment of wetting, with the ratings scale ranging from 0 to 100 (100 =best, i.e., lowest wetting). The abovementioned AATCC test methods can be found in the "AATCC (American Association of Textile Chemists and Colorists) Technical Manual" Vol. 73, 1998, pages 62–63 and 186–188.

EXAMPLES 1 to 4

(non-inventive)

Preparation of a dispersion of component A1

In a four-necked 2 l flask equipped with stirrer, thermometer and reflux condenser, 225 g of a commercially customary polyisocyanate based on a reaction product of trimethylolpropane and toluene diisocyanate (75% strength solution in ethyl acetate) were dissolved at room temperature in 399 g of methyl isobutyl ketone. 63.75 g of butanone oxime were added to the solution over the course of 10 minutes with stirring. During this addition the temperature rose from 24 to about 50° C. The mixture was stirred for a further 15 minutes, after which it was tested for free NCO groups, the result being negative. In a glass beaker a homogeneous mixture was formed from 834 g of tap water, 60 g of propylene glycol, 23.25 g of a commercially customary quaternary ammonium chloride (polyoxyethylenestearylmethylammonium chloride) and 23.25 g of MARLOWET 5401 (acetate of an alkyloxy-alkylamine ethoxylate, from Condea Chemie). The organic phase obtained in the four-necked flask was stirred into this aqueous emulsifier solution. A preemulsion was prepared in about 5 minutes by stirring using a high-speed stirrer (Ultra-Turrax). The pH of the resulting mixture was 5.2. It was adjusted to 2.5 by adding 13.81 g of concentrated (approximately 31% strength) hydrochloric acid. The mixture was subsequently homogenized in four passes through a high-pressure homogenizing machine (manufacturer: Manton-Gaulin) at an operating pressure of approximately 300 bar. The initial temperature of the mixture was 24° C.; the final temperature of the dispersion obtained after the fourth pass was 35° C. The dispersion obtained was white and viscous.

Subsequently, the solvents and some of the water were removed from 1000 g of the resultant dispersion by distillation in a rotary evaporator at a bath temperature of 70° C. under reduced pressure (270 mbar absolute pressure). This gave 698 g of an aqueous dispersion having a dry-matter content of 24.9% by weight, which was adjusted to 22.5% by weight by adding water. The resulting dispersion showed good stability to mechanical and thermal effects.

Preparation of a dispersion of component D4

In a glass beaker, 30 g of the quaternary ammonium chloride specified in Examples 1–4, 200 g of dipropylene glycol, 480 g of tap water, 480 g of a commercially customary perfluoroalkylethyl acrylate (perfluoroalkyl radicals of 6–12 carbon atoms), 120 g of stearyl methacrylate, 4.8 g of n-dodecyl mercaptan (chain length regulator) and 20 g of N-(butoxy-methyl)methacrylamide were heated to 45° C. and stirred using a turbine stirrer (Turrax) for 2 minutes, after which the pH was adjusted from 7.2 to 2.8 using 0.6 g of 31% strength hydrochloric acid. This gave a good preemulsion which was opalescent to turbid in appearance. The resulting dispersion was transferred to an autoclave.

In a glass beaker, 6.4 g of Azo-Starter V50 (2,2'-azobis (2-amidinopropane)dihydrochloride, from Transol) were dissolved at room temperature in 57.6 g of tap water and the solution was added to the autoclave. In order to remove the oxygen from the autoclave, it was fully deaerated seven times by applying a vacuum and restoring the pressure with nitrogen. The closed autoclave was heated by means of a bath set at 76° C., and the reaction mixture was stirred at 200 rpm. The initially milky dispersion became more transparent after about half an hour. At the same time, the overpressure in the autoclave rose from initially 0 to 0.5 bar and the internal temperature to 68° C. after one hour. The reaction mixture was stirred with heating for seven hours more, during which the appearance of the dispersion underwent no further change but the overpressure in the autoclave rose to 1.8 bar. The product was 1360 g of a slightly transparent dispersion having a dry-matter content of 45.4%, which at 43% fluorine in the dry matter corresponds to a fluorine content of 19.5% in the dispersion.

Dispersions of components D1 to D3 can be prepared analogously.

Four liquors were prepared with the following components:

2 g/l acetic acid 60% by weight 20 g/l KNITTEX FLC 6 g/l KNITTEX catalyst MO 10 g/l of the dispersion of component A1 component D (for amount see below)

KNITTEX FLC (from Ciba Spezialitätenchemie Pfersee) is a cellulose crosslinker based on etherified dimethyloldihydroxyethyleneurea, KNITTEX catalyst MO (from Ciba Spezialitätenchemie Pfersee) is a crosslinking catalyst. Both of these products were added to the liquors in order to give the fabrics improved crease properties. In addition to the components quantified above, each of the liquors 1–4 was admixed with a defined amount of an aqueous dispersion, containing at least one emulsifier and possibly further auxiliaries, of a copolymer containing fluorine (component D), such that each liquor contains 1.2 g of fluorine/l. The following components D were added:

| Example (liquor) | Component D) | Copolymer | Fluorine content in dispersion | Amount dispersion |
|---|---|---|---|---|
| 1 | D1 | Copolymer of perfluoroalkyl ethyl acrylate, vinylidene chloride and stearyl methacrylate, containing acetone | 6% | 20 g/l |
| 2 | D2 | Copolymer of perfluoroalkylethyl acrylate, vinylidene chloride and stearyl methacrylate | 6% | 20 g/l |
| 3 | D3 | Copolymer of perfluoroalkylethyl acrylate, vinylidene chloride and stearyl methacrylate | 20% | 6 g/l |
| 4 | D4 | Copolymer of perfluoroalkylethyl acrylate, stearyl methacrylate and N-butoxymethyl-methacrylamide | 19.5% | 6.15 g/l |

The finishing liquors obtained in this way were applied at room temperature using a pad mangle to blue cotton twill with a liquor addon of approximately 100%, based on the weight of the goods. The fabrics were then dried at 110° C. for 10 minutes in a drying cabinet and subsequently condensed at 150° C. for 5 minutes. After laundering and/or dry-cleaning, the fabrics were ironed. The cotton fabrics finished in Examples 1 to 4 give the test results set out in Table 1.

The dispersions of Examples 1–4 differ from the dispersions of the invention in that a component A) is present but no component B).

TABLE 1

| | Example | | | |
|---|---|---|---|---|
| | No. 1 | No. 2 | No. 3 | No. 4 |
| Initial data | | | | |
| Oil repellence | 3 | 5 | 6 | 6 |
| Spray test | 80 | 100 | 100 | 100 |
| Water absorption | 33% | 26% | 17% | 15% |
| Bead effect (1/5/10 min.) | 1/1/1 | 3/1/1 | 5/5/5 | 5/5/4 |
| After 5 washes/60° C. | | | | |
| Oil repellence | 1 | 2 | 4 | 5 |
| Spray test | 70 | 60 | 70 | 70 |
| Water absorption | 50% | 43% | 41% | 34% |
| Bead effect | 1/1/1 | 1/1/1 | 1/1/1 | 1/1/1 |
| After 1 × dry-cleaning with cleaning enhancer | | | | |
| Oil repellence | 3 | 4 | 5 | 5 |
| Spray test | 70 | 80 | 100 | 100 |
| Water absorption | 37% | 27% | 23% | 18% |
| Bead effect | 1/1/1 | 2/1/1 | 5/4/2 | 5/3/2 |

EXAMPLES 5 to 8

(inventive)

Preparation of component B1 (aqueous solution)

88 g of ARALDIT® GY 266 (bisphenol A—diglycidyl ether from Ciba Specialty Chemicals Inc.) were introduced into a 1 l three-necked flask, after which the flask was inertized by applying a vacuum and relieving it with nitrogen. Then 235.6 g of isopropanol were added and the mixture was brought to 29° C. with stirring. In addition, 31.5 g of 90% pure, melted hexamethylene-diamine were added slowly to the mixture with stirring, cooling with an ice bath to ensure that the internal temperature did not exceed 35° C. After all of the hexamethylenediamine had been added, stirring was continued until the solution had an opalescent bluish appearance. With further stirring, 26 g of 60% strength acetic acid were added in one portion and the whole mixture was diluted with 520 g of water. The composition was heated to 45° C., and 356.3 g of isopropanol/water were removed by distillation under a water pump vacuum with the temperature being slowly increased to 55° C. After cooling to 30° C. the pH was 8.5 and the density was 1.037 g/ccm. The product was a bluish aqueous solution of low viscosity containing about 25% of component B1.

Preparation of a dispersion of component A1 and component B1

In a four-necked 2 l flask equipped with stirrer, thermometer and reflux condenser, 225 g of a commercially customary polyisocyanate based on a reaction product of trimethylolpropane and toluene diisocyanate (75% strength solution in ethyl acetate) were dissolved at room temperature in 399 g of methyl isobutyl ketone. 63.75 g of butanone oxime were added to the solution over the course of 10 minutes with stirring. During this addition the temperature rose from 24 to about 50° C. The mixture was stirred for a further 15 minutes, after which it was tested for free NCO groups, the result being negative. In a glass beaker a homogeneous mixture was formed from 834 g of tap water, 60 g of propylene glycol, 6 g of the quaternary ammonium chloride stated in Examples 1–4 and 115.5 g of the aqueous solution of component B1. The organic phase containing blocked polyisocyanate and obtained in the four-necked flask was stirred into this aqueous emulsifier solution. A preemulsion was prepared in about 5 minutes by stirring using a high-speed stirrer (Ultra-Turrax). The pH of the resulting mixture was 5.2. It was adjusted to 2.5 by adding 13.81 g of concentrated (approximately 31% strength) hydrochloric acid. The mixture was subsequently homogenized in four passes through a high-pressure homogenizing machine (manufacturer: Manton-Gaulin) at an operating pressure of approximately 300 bar. The initial temperature of the mixture was 24° C.; the final temperature of the dispersion obtained after the fourth pass was 35° C. The dispersion obtained was white and viscous.

Subsequently, the solvents and some of the water were removed from 1000 g of the resultant dispersion by distillation in a rotary evaporator at a bath temperature of 70° C. under reduced pressure (270 mbar absolute pressure). This gave 648 g of an aqueous dispersion having a dry-matter content of 26.8% by weight, which was adjusted to 22.5% by weight by adding water. The resulting dispersion showed good stability to mechanical and thermal effects.

Four liquors were prepared with the following components:

2 g/l acetic acid 60% by weight 20 g/l KNITTEX FLC 6 g/l KNITTEX catalyst MO 10 g/l of the dispersion of component A1 and of component B1 component D (for amount see below)

In addition to the components quantified above, each liquor, as in Examples 1–4, was admixed with a defined amount of an aqueous dispersion, containing at least one emulsifier and possibly further auxiliaries, of a copolymer containing fluorine (component D), such that each liquor contains 1.2 g of fluorine/l. The following components D (also used in Examples 1–4) were added:

| Example (liquor) | Component D | Fluorine content in dispersion | Amount dispersion |
|---|---|---|---|
| 5 | D1 | 6% | 20 g/l |
| 6 | D2 | 6% | 20 g/l |
| 7 | D3 | 20% | 6 g/l |
| 8 | D4 | 19.5% | 6.15 g/l |

The finishing liquors obtained in this way were applied at room temperature using a pad mangle to blue cotton twill with a liquor add-on of approximately 100%, based on the weight of the goods. The fabrics were then dried at 110° C. for 10 minutes in a drying cabinet and subsequently condensed at 150° C. for 5 minutes. After laundering and/or dry-cleaning, the fabrics were ironed. The cotton fabrics finished in Examples 5 to 8 give the test results set out in Table 2.

TABLE 2

| | Example | | | |
|---|---|---|---|---|
| | No. 5 | No. 6 | No. 7 | No. 8 |
| Initial data | | | | |
| Oil repellence | 5 | 6 | 6 | 6 |
| Spray test | 100 | 100 | 100 | 100 |
| Water absorption | 12% | 11% | 8% | 9% |
| Bead effect (1/5/10 min.) | 5/5/5 | 5/5/5 | 5/5/5 | 5/5/5 |
| After 5 washes/60° C. | | | | |
| Oil repellence | 4 | 4 | 5 | 5 |
| Spray test | 80 | 80 | 90 | 80 |
| Water absorption | 36% | 33% | 31% | 36% |

TABLE 2-continued

| | Example | | | |
|---|---|---|---|---|
| | No. 5 | No. 6 | No. 7 | No. 8 |
| Bead effect After 1 × dry-cleaning with cleaning enhancer | 2/1/1 | 2/1/1 | 3/3/2 | 3/1/1 |
| Oil repellence | 5 | 5 | 5 | 5 |
| Spray test | 100 | 100 | 100 | 100 |
| Water absorption | 16% | 11% | 11% | 10% |
| Bead effect | 5/4/3 | 5/5/4 | 5/5/5 | 5/5/5 |

In a comparison of the inventive Examples 5–8 with the noninventive Examples 1–4 it is noted that the values obtained for Examples 5–8 are clearly better, both for the finished materials as such and for the laundered or dry-cleaned materials.

EXAMPLES 9 to 12

(non-inventive)

Preparation of a dispersion of component A2

187.5 g of the commercially customary cycloaliphatic polyisocyanate blocked with acetone oxime (60% strength solution in xylene/butyl acetate) were dissolved in 93.75 g of methyl isobutyl ketone. In a glass beaker a homogeneous mixture was formed from 370 g of demineralized water, 29 g of propylene glycol and 19 g of the quaternary ammonium chloride specified in Examples 1–4. The solution of the blocked polyisocyanate was stirred into this aqueous emulsifier solution. A preemulsion was prepared using a high-speed stirrer (Ultra-Turrax). The pH of the resulting mixture was 7.5. It was adjusted to 2.5 by adding 0.8 g of concentrated (approximately 31% strength) hydrochloric acid. The mixture was subsequently homogenized in four passes through a high-pressure homogenizing machine (manufacturer: Manton-Gaulin) at an operating pressure of approximately 300 bar. The initial temperature of the mixture was 25° C.; the final temperature of the dispersion obtained after the fourth pass was 36° C. 664 g of dispersion were obtained.

Subsequently, the resulting dispersion was subjected to distillation in a 1 l three-necked flask at a bath temperature of 70° C. under reduced pressure (370–200 mbar absolute pressure) for 40 minutes, in the course of which the solvents together with some of the water were removed by distillation. This gave 452 g of an aqueous dispersion having a dry-matter content of 27.1% by weight, which was adjusted to 22.5% by weight by adding water. The resulting dispersion showed good stability to mechanical and thermal effects.

Four liquors were prepared with the following components:

2 g/l acetic acid 60% by weight 20 g/l KNITTEX FLC 6 g/l KNITTEX catalyst MO 10 g/l of the dispersion of component A2 component D (for amount see below)

In addition to the components quantified above, each liquor was admixed with a defined amount of an aqueous dispersion, containing at least one emulsifier and possibly further auxiliaries, of a copolymer containing fluorine (component D), such that each liquor contains 1.2 g of fluorine/l. The following components D (also used in Examples 1–4) were added:

| Example (liquor) | Component D | Fluorine content in dispersion | Amount dispersion |
| --- | --- | --- | --- |
| 9 | D1 | 6% | 20 g/l |
| 10 | D2 | 6% | 20 g/l |
| 11 | D3 | 20% | 6 g/l |
| 12 | D4 | 19.5% | 6.15 g/l |

The finishing liquors obtained in this way were applied at room temperature using a pad mangle to blue cotton twill with a liquor addon of approximately 100%, based on the weight of the goods. The fabrics were then dried at 110° C. for 10 minutes in a drying cabinet and subsequently condensed at 150° C. for 5 minutes. After laundering and/or dry-cleaning, the fabrics were ironed. The cotton fabrics finished in Examples 9 to 12 give the test results set out in Table 3.

TABLE 3

| | Example | | | |
| --- | --- | --- | --- | --- |
| | No. 9 | No. 10 | No. 11 | No. 12 |
| Initial data | | | | |
| Oil repellence | 6 | 6 | 6 | 6 |
| Spray test | 70 | 80 | 70 | 100 |
| Water absorption | 41% | 39% | 33% | 15% |
| Bead effect (1/5/10 min.) | 1/1/1 | 1/1/1 | 1/1/1 | 5/4/3 |
| After 5 washes/60° C. | | | | |
| Oil repellence | 0 | 0 | 1 | 5 |
| Spray test | 50 | 60 | 60 | 70 |
| Water absorption | 56% | 53% | 46% | 38% |
| Bead effect | 1/1/1 | 1/1/1 | 1/1/1 | 1/1/1 |
| After 1 × dry-cleaning with cleaning enhancer | | | | |
| Oil repellence | 0 | 2 | 3 | 5 |
| Spray test | 70 | 80 | 70 | 90 |
| Water absorption | 43% | 39% | 43% | 29% |
| Bead effect | 1/1/1 | 1/1/1 | 1/1/1 | 3/1/1 |

EXAMPLES 13 to 16
(inventive)
Preparation of a dispersion of component A2 and component B1

187.5 g of the blocked polyisocyanate specified in Examples 9–12 were dissolved in 93.75 g of methyl isobutyl ketone. In a glass beaker a homogeneous mixture was formed from 370 g of demineralized water, 29 g of propylene glycol, 55.8 g of the aqueous solution of component B1 prepared for Examples 5–8 and 2.9 g of the quaternary ammonium chloride specified in Examples 1–4. The solution of the blocked polyisocyanate was stirred into this aqueous emulsifier solution. A preemulsion was prepared using a high-speed stirrer (Ultra-Turrax). The pH of the resulting mixture was 7.1. It was adjusted to 2.5 by adding 1.5 g of concentrated (approximately 31% strength) hydrochloric acid. The mixture was subsequently homogenized in four passes to a high-pressure homogenizing machine (manufacturer: Manton-Gaulin) at an operating pressure of approximately 300 bar. The initial temperature of the mixture was 25° C.; the final temperature of the dispersion obtained after the fourth pass was 36° C. 694 g of dispersion were obtained.

Subsequently, the resulting dispersion was subjected to distillation in a 1 l three-necked flask at a bath temperature of 70° C. under reduced pressure (370–200 mbar absolute pressure) for 40 minutes, in the course of which the solvents together with some of the water were removed by distillation. This gave 473 g of an aqueous dispersion having a dry-matter content of 25.7% by weight, which was adjusted to 22.5% by weight by adding water. The resulting dispersion showed good stability to mechanical and thermal effects.

Four liquors were prepared with the following components:

2 g/l acetic acid 60% by weight
20 g/l KNITTEX FLC
6 g/l KNITTEX catalyst MO
10 g/l of the dispersion of component A2 and of component B1component D (for amount see below)

In addition to the components quantified above, each liquor was admixed with a defined amount of an aqueous dispersion, containing at least one emulsifier and possibly further auxiliaries, of a copolymer containing fluorine (component D), such that each liquor contains 1.2 g of fluorine/l. The following components D (also used in Examples 1–4) were added:

| Example (liquor) | Component D | Fluorine content in dispersion | Amount dispersion |
| --- | --- | --- | --- |
| 13 | D1 | 6% | 20 g/l |
| 14 | D2 | 6% | 20 g/l |
| 15 | D3 | 20% | 6 g/l |
| 16 | D4 | 19.5% | 6.15 g/l |

The finishing liquors obtained in this way were applied at room temperature using a pad mangle to blue cotton twill with a liquor addon of approximately 100%, based on the weight of the goods. The fabrics were then dried at 110° C. for 10 minutes in a drying cabinet and subsequently condensed at 150° C. for 5 minutes. After laundering and/or dry-cleaning, the fabrics were ironed. The cotton fabrics finished in Examples 13 to 16 give the test results set out in Table 4.

TABLE 4

| | Example | | | |
| --- | --- | --- | --- | --- |
| | No. 13 | No. 14 | No. 15 | No. 16 |
| Initial data | | | | |
| Oil repellence | 6 | 6 | 6 | 6 |
| Spray test | 100 | 100 | 100 | 100 |
| Water absorption | 8% | 8% | 7% | 7% |
| Bead effect (1/5/10 min.) | 5/5/5 | 5/5/5 | 5/5/5 | 5/5/5 |
| After 5 washes/60° C. | | | | |
| Oil repellence | 5 | 4 | 5 | 5 |
| Spray test | 80 | 80 | 90 | 80 |
| Water absorption | 32% | 31% | 27% | 29% |
| Bead effect | 3/2/1 | 2/1/1 | 3/3/2 | 2/1/1 |
| After 1 × dry-cleaning with cleaning enhancer | | | | |
| Oil repellence | 5 | 5 | 5 | 5 |
| Spray test | 100 | 100 | 100 | 100 |
| Water absorption | 11% | 17% | 25% | 28% |
| Bead effect | 5/5/5 | 5/4/2 | 5/3/2 | 3/1/1 |

In a comparison of the inventive Examples 13–16 with the noninventive Examples 9–12 it is noted that the values obtained for Examples 13–16 are clearly better, both for the finished materials as such and for the laundered or dry-cleaned materials.

Examples 17 to 23 investigate the different effects of inventive and noninventive dispersions when using different components A. To each of the liquors used there were added 6 g/l of a dispersion of component D3 (also used in Examples 1–4), so that each liquor contained 1.2 g of fluorine/l.

EXAMPLE 17

(inventive)

Preparation of a dispersion of component A2 and component B1

A dispersion having a dry-matter content of 22.5% by weight as in Examples 13–16 was prepared.

A liquor was prepared with the following components:

2 g/l acetic acid 60% by weight
20 g/l KNITTEX GM conc.
6 g/l KNITTEX catalyst MO
10 g/l of the dispersion of component A2 and of component B1
6 g/l dispersion of component D3

KNITTEX GM conc. (from Ciba Spezialitätenchemie Pfersee) is a cellulose crosslinker based on dimethyloldihydroxyethyleneurea and etherified methylolated melamine.

EXAMPLE 18

(noninventive)

Preparation of a dispersion of component A2

A dispersion as in Examples 9–12 was prepared.

A liquor was prepared with the following components:

2 g/l acetic acid 60% by weight
20 g/l KNITTEX GM conc.
6 g/l KNITTEX catalyst MO
10 g/l of the dispersion of component A2
6 g/l dispersion of component D3

EXAMPLE 19

(inventive)

Preparation of a dispersion of component A3 and component B1

187.5 g of the commercially customary cycloaliphatic polyisocyanate blocked with butanone oxime (60% strength solution in xylene/butyl acetate) were dissolved in 93.75 g of methyl isobutyl ketone. In a glass beaker a homogeneous mixture was formed from 370 g of demineralized water, 29 g of propylene glycol, 55.8 g of the aqueous solution of component B1 prepared for Examples 5–8 and 2.9 g of the quaternary ammonium chloride specified in Examples 1–4. The solution of the blocked polyisocyanate was stirred into this aqueous emulsifier solution. A preemulsion was prepared using a high-speed stirrer (Ultra-Turrax). The pH of the resulting mixture was 7.2. It was adjusted to 2.5 by adding 6.8 g of concentrated (approximately 31% strength) hydrochloric acid. The mixture was subsequently homogenized in four passes through a high-pressure homogenizing machine (manufacturer: Manton-Gaulin) at an operating pressure of approximately 300 bar. The initial temperature of the mixture was 25° C.; the final temperature of the dispersion obtained after the fourth pass was 36° C. 704 g of dispersion were obtained.

Subsequently, the resulting dispersion was subjected to distillation in a 1 l three-necked flask at a bath temperature of 70° C. under reduced pressure (370–200 mbar absolute pressure) for 40 minutes, in the course of which the solvents together with some of the water were removed by distillation. This gave 454 g of an aqueous dispersion having a dry-matter content of 27.3% by weight, which was adjusted to 22.5% by weight by adding water. The resulting dispersion showed good stability to mechanical and thermal effects.

A liquor was prepared with the following components:

2 g/l acetic acid 60% by weight
20 g/l KNITTEX GM conc.
6 g/l KNITTEX catalyst MO
10 g/l of the dispersion of component A3 and of component B1
6 g/l dispersion of component D3

EXAMPLE 20

(noninventive)

Preparation of a dispersion of component A3

187.5 g of the cycloaliphatic blocked polyisocyanate specified in Example 19 were dissolved in 93.75 g of methyl isobutyl ketone. In a glass beaker a homogeneous mixture was formed from 370 g of demineralized water, 29 g of propylene glycol and 19 g of the quaternary ammonium chloride specified in Examples 1–4. The solution of the blocked polyisocyanate was stirred into this aqueous emulsifier solution. A preemulsion was prepared using a high-speed stirrer (Ultra-Turrax). The pH of the resulting mixture was 8. It was adjusted to 2.5 by adding 1 g of concentrated (approximately 31% strength) hydrochloric acid. The mixture was subsequently homogenized in four passes through a high-pressure homogenizing machine (manufacturer: Manton-Gaulin) at an operating pressure of approximately 300 bar. The initial temperature of the mixture was 25° C.; the final temperature of the dispersion obtained after the fourth pass was 36° C. 680 g of dispersion were obtained.

Subsequently, the resulting dispersion was subjected to distillation in a 1 l three-necked flask at a bath temperature of 700° C. under reduced pressure (370–200 mbar absolute pressure) for 40 minutes, in the course of which the solvents together with some of the water were removed by distillation. This gave 441 g of an aqueous dispersion having a dry-matter content of 28.5% by weight, which was adjusted to 22.5% by weight by adding water. The resulting dispersion showed good stability to mechanical and thermal effects.

A liquor was prepared with the following components:

2 g/l acetic acid 60% by weight
20 g/l KNITTEX GM conc.
6 g/l KNITTEX catalyst MO
10 g/l of the dispersion of component A3
6 g/l dispersion of component D3

EXAMPLE 21

(inventive)

Preparation of a dispersion of component A4 and component B1

112.5 g of a commercially customary cycloaliphatic polyisocyanate blocked with butanone oxime were dissolved in 168.8 g of methyl isobutyl ketone. In a glass beaker a homogeneous mixture was formed from 370 g of demineralized water, 29 g of propylene glycol, 55.8 g of the aqueous solution of component B1 prepared for Examples 5–8 and 2.9 g of the quaternary ammonium chloride specified in Examples 1–4. The solution of the blocked polyisocyanate was stirred into this aqueous emulsifier solution. A preemulsion was prepared using a high-speed stirrer (Ultra-Turrax). The pH of the resulting mixture was 7.2. It was adjusted to 2.5 by adding 7 g of concentrated (approximately 31% strength) hydrochloric acid. The mixture was subsequently homogenized in four passes through a high-pressure homogenizing machine (manufacturer: Manton-Gaulin) at an operating pressure of approximately 300 bar. The initial temperature of the mixture was 25° C.; the final temperature of the dispersion obtained after the fourth pass was 36° C. 687 g of dispersion were obtained.

Subsequently, the resulting dispersion was subjected to distillation in a 1 l three-necked flask at a bath temperature of 70° C. under reduced pressure (370–200 mbar absolute pressure) for 40 minutes, in the course of which the solvents together with some of the water were removed by distillation. Due to severe foaming, the distillation was carried out at 250 mbar at the end. This gave 437 g of an aqueous dispersion having a dry-matter content of 26.6% by weight, which was adjusted to 22.5% by weight by adding water. The resulting dispersion showed good stability to mechanical and thermal effects.

A liquor was prepared with the following components:
2 g/l acetic acid 60% by weight
20 g/l KNITTEX GM conc.
6 g/l KNITTEX catalyst MO
10 g/l of the dispersion of component A4 and of component B1
6 g/l dispersion of component D3

EXAMPLE 22
(noninventive)
Preparation of a dispersion of component A4

112.5 g of the cycloaliphatic blocked polyisocyanate specified in Example 21 were dissolved in 168.8 g of methyl isobutyl ketone. In a glass beaker a homogeneous mixture was formed from 370 g of demineralized water, 29 g of propylene glycol and 19 g of the quaternary ammonium chloride specified in Examples 1–4. The solution of the blocked polyisocyanate was stirred into this aqueous emulsifier solution. A preemulsion is prepared using a high-speed stirrer (Ultra-Turrax). The pH of the resulting mixture was 8.1. It was adjusted to 2.5 by adding 0.7 g of concentrated (approximately 31% strength) hydrochloric acid. The mixture was subsequently homogenized in four passes through a high-pressure homogenizing machine (manufacturer: Manton-Gaulin) at an operating pressure of approximately 300 bar. The initial temperature of the mixture was 25° C.; the final temperature of the dispersion obtained after the fourth pass was 36° C. 664 g of dispersion were obtained.

Subsequently, the resulting dispersion was subjected to distillation in a 1 l three-necked flask at a bath temperature of 70° C. under reduced pressure (370–200 mbar absolute pressure) for 40 minutes, in the course of which the solvents together with some of the water were removed by distillation. This gave 430 g of an aqueous dispersion having a dry-matter content of 26.7% by weight, which was adjusted to 22.5% by weight by adding water. The resulting dispersion showed good stability to mechanical and thermal effects.

A liquor was prepared with the following components:
2 g/l acetic acid 60% by weight
20 g/l KNITTEX GM conc.
6 g/l KNITTEX catalyst MO
10 g/l of the dispersion of component A4
6 g/l dispersion of component D3

EXAMPLE 23
(inventive)
Preparation of a dispersion of component A1 and component B1

A dispersion having a dry-matter content of 22.5% by weight as in Examples 5–8 was prepared.

A liquor was prepared with the following components:
2 g/l acetic acid 60% by weight
20 g/l KNITTEX GM conc.
6 g/l KNITTEX catalyst MO
10 g/l of the dispersion of component A1 and of component B1
6 g/l dispersion of component D3

The finishing liquors obtained in Examples 17–23 were applied at room temperature using a pad mangle to blue cotton twill with a liquor addon of approximately 100%, based on the weight of the goods. The fabrics were then dried at 110° C. for 10 minutes in a drying cabinet and subsequently condensed at 150° C. for 5 minutes. After laundering and/or dry-cleaning, the fabrics were ironed. The cotton fabrics finished in Examples 17 to 23 give the test results set out in Table 5.

TABLE 5

| | Example | | | | | | |
|---|---|---|---|---|---|---|---|
| | No. 17 | No. 18 | No. 19 | No. 20 | No. 21 | No. 22 | No. 23 |
| Initial data | | | | | | | |
| Oil repellence | 6 | 5 | 6 | 6 | 6 | 6 | 6 |
| Spray test | 100 | 70 | 100 | 70 | 100 | 80 | 100 |
| Water absorption | 6% | 28% | 7% | 35% | 7% | 37% | 10% |
| Bead effect (1/5/10 min.) | 5/5/5 | 1/1/1 | 5/5/5 | 1/1/1 | 5/5/5 | 1/1/1 | 5/5/5 |
| After 5 washes/60° C. | | | | | | | |
| Oil repellence | 6 | 2 | 6 | 1 | 6 | 1 | 6 |
| Spray test | 90 | 50 | 90 | 50 | 90 | 50 | 90 |
| Water absorption | 28% | 42% | 27% | 49% | 31% | 48% | 33% |
| Bead effect | 5/2/1 | 1/1/1 | 5/4/3 | 1/1/1 | 5/3/1 | 1/1/1 | 5/2/1 |
| After 1 × dry-cleaning with cleaning enhancer | | | | | | | |
| Oil repellence | 4 | 2 | 4 | 0 | 4 | 0 | 5 |
| Spray test | 100 | 50 | 100 | 50 | 100 | 50 | 100 |
| Water absorption | 37% | 46% | 32% | 47% | 30% | 47% | 12% |
| Bead effect | 2/1/1 | 1/1/1 | 5/1/1 | 1/1/1 | 5/1/1 | 1/1/1 | 5/5/5 |

In a comparison of the inventive Examples 17, 19, 21 and 23 with the noninventive Examples 18, 20 and 22 it is noted that the values obtained for the inventive examples are clearly better, both for the finished materials as such and for the laundered or dry-cleaned materials.

EXAMPLES 24–32
(inventive)

Examples 24–32 examine the influence of different weight ratios of fluorocopolymer to compositions of the invention comprising components A) and B). Nine liquors were prepared, in analogy to Example 7, with the following components:

2 g/l acetic acid 60% by weight
20 g/l KNITTEX FLC
6 g/l KNITTEX catalyst MO dispersion comprising components A1 and B1 from Examples 5–8 component D3

The following amounts (in g/l of liquor) of dispersion comprising component A1 and B1 and, respectively, of dispersion of component D3 (also used in Examples 1–4) were used:

|  | Example (liquor) | | | | | | | | |
| --- | --- | --- | --- | --- | --- | --- | --- | --- | --- |
|  | 24 | 25 | 26 | 27 | 28 | 29 | 30 | 31 | 32 |
| Component D3 | 3 | 3 | 3 | 6 | 6 | 6 | 9 | 9 | 9 |
| Dispersion A1/B1 | 1 | 3 | 6 | 1 | 3 | 6 | 1 | 3 | 6 |

The finishing liquors obtained in this way were applied at room temperature using a pad mangle to blue cotton twill with a liquor addon of approximately 100%, based on the weight of the goods. The fabrics were then dried at 110° C. for 10 minutes in a drying cabinet and subsequently condensed at 150° C. for 5 minutes. After laundering and/or dry-cleaning, the fabrics were ironed. The cotton fabrics finished in Examples 24 to 32 give the test results set out in Table 6.

(approximately 31% strength) hydrochloric acid. The mixture was subsequently homogenized in four passes through a high-pressure homogenizing machine (manufacturer: Manton-Gaulin) at an operating pressure of approximately 300 bar. The initial temperature of the mixture was 25° C.; the final temperature of the dispersion obtained after the fourth pass was 36° C.

Subsequently, the resulting dispersion was subjected to distillation in a 1 l three-necked flask at a bath temperature of 70° C. under reduced pressure (280–200 mbar absolute pressure) for 45 minutes, in the course of which solvent together with some of the water was removed. This gave 373 g of an aqueous dispersion having a dry-matter content of 28.4% by weight, which was adjusted to 22.5% by weight by adding water. The resulting dispersion showed good stability to mechanical and thermal effects.

TABLE 6

|  | Example | | | | | | | | |
| --- | --- | --- | --- | --- | --- | --- | --- | --- | --- |
|  | No. 24 | No. 25 | No. 26 | No. 27 | No. 28 | No. 29 | No. 30 | No. 31 | No. 32 |
| Initial data | | | | | | | | | |
| Oil repellence | 2 | 4 | 4 | 4 | 5 | 6 | 5 | 6 | 6 |
| Spray test | 80 | 80 | 100 | 80 | 100 | 100 | 80 | 100 | 100 |
| Water absorption | 40% | 30% | 17% | 29% | 23% | 9% | 27% | 20% | 9% |
| Bead effect (1/5/10 min.) | 1/1/1 | 2/1/1 | 5/5/5 | 1/1/1 | 3/2/2 | 5/5/5 | 1/1/1 | 5/3/2 | 5/5/5 |
| After 5 washes/60° C. | | | | | | | | | |
| Oil repellence | 0 | 2 | 3 | 2 | 3 | 4 | 3 | 5 | 6 |
| Spray test | 70 | 70 | 80 | 50 | 70 | 90 | 50 | 80 | 90 |
| Water absorption | 48% | 40% | 37% | 35% | 32% | 17% | 37% | 18% | 12% |
| Bead effect | 1/1/1 | 1/1/1 | 5/2/1 | 1/1/1 | 4/1/1 | 5/5/4 | 1/1/1 | 5/5/4 | 5/5/5 |
| After 1 × dry-cleaning with cleaning enhancer | | | | | | | | | |
| Oil repellence | 0 | 0 | 1 | 3 | 3 | 4 | 3 | 5 | 6 |
| Spray test | 70 | 70 | 90 | 70 | 80 | 90 | 70 | 90 | 90 |
| Water absorption | 64% | 54% | 49% | 46% | 36% | 30% | 37% | 28% | 23% |
| Bead effect | 1/1/1 | 1/1/1 | 2/1/1 | 1/1/1 | 2/1/1 | 5/5/3 | 1/1/1 | 2/1/1 | 5/5/3 |

EXAMPLES 33–37

(inventive)

Examples 33–37 investigate the influence of different weight ratios of component A) to component B) and/or to component C) (dispersant) in the compositions of the invention.

EXAMPLE 33

Preparation of a dispersion of component A1 and component B1

In a procedure analogous to that of Examples 5–8, a commercially customary polyisocyanate based on a reaction product of trimethylolpropane and toluene isocyanate (75% strength solution in ethyl acetate) was dissolved in methyl isobutyl ketone and blocked with butanone oxime, giving a solution containing 33.3% of component A1. In a glass beaker a homogeneous mixture was formed from 330 g of tap water, 20 g of propylene glycol, 7.5 g of the quaternary ammonium chloride specified in Examples 1–4, 30 g of the aqueous solution of component B1 (prepared as for Examples 5–8) and 300 g of the solution of component A1 and a preemulsion was prepared using a high-speed stirrer (Ultra-Turrax). The pH of the resulting mixture was 7.4. It was adjusted to 2.5 by adding 3.7 g of concentrated

EXAMPLES 34–37

Preparation of dispersions of component A1 and component B1

In a procedure similar to that for Example 33, dispersions were prepared but with different amounts (in g) of components B) and C) as follows:

|  | Example 33 | Example 34 | Example 35 | Example 36 | Example 37 |
| --- | --- | --- | --- | --- | --- |
| Solution of component B1 | 30 | 80 | 60 | 50 | 60 |
| Quaternary ammonium chloride specified in Examples 1–4 | 7.5 | 0 | 0 | 2.5 | 5 |

In Examples 34–37, in the preparation of the dispersions, a smaller amount of tap water was used in accordance with the amount of water introduced as a result of the larger quantity of the aqueous solution of component B1.

Five liquors were prepared with the following components:

2 g/l acetic acid 60% by weight 20 g/l KNITTEX FLC 6 g/l KNITTEX catalyst MO 10 g/l of the respective dispersion of component A1 and of component B1

6 g/l of component D3 (also used in Examples 1–4)

The finishing liquors obtained in this way were applied at room temperature using a pad mangle to blue cotton twill with a liquor addon of approximately 100%, based on the weight of the goods. The fabrics were then dried at 110° C. for 10 minutes in a drying cabinet and subsequently condensed at 150° C. for 5 minutes. After laundering and/or dry-cleaning, the fabrics were ironed. The cotton fabrics finished in Examples 33 to 37 give the test results set out in Table 7.

TABLE 7

|  | Example | | | | |
| --- | --- | --- | --- | --- | --- |
|  | No. 33 | No. 34 | No. 35 | No. 36 | No. 37 |
| Initial data | | | | | |
| Oil repellence | 6 | 6 | 6 | 6 | 6 |
| Spray test | 100 | 100 | 100 | 100 | 100 |
| Water absorption | 17% | 8% | 8% | 8% | 12% |
| Bead effect (1/5/10 min.) | 5/4/4 | 5/5/5 | 5/5/5 | 5/5/5 | 5/5/5 |
| After 5 washes/60° C. | | | | | |
| Oil repellence | 6 | 6 | 6 | 6 | 6 |
| Spray test | 70 | 90 | 90 | 90 | 80 |
| Water absorption | 36% | 31% | 22% | 27% | 28% |
| Bead effect | 1/1/1 | 2/2/1 | 3/3/3 | 3/3/3 | 2/1/1 |
| After 1 × dry-cleaning with cleaning enhancer | | | | | |
| Oil repellence | 3 | 6 | 6 | 5 | 5 |
| Spray test | 90 | 100 | 100 | 100 | 90 |
| Water absorption | 34% | 18% | 10% | 13% | 30% |
| Bead effect | 3/1/1 | 4/4/3 | 5/5/5 | 5/5/4 | 3/2/2 |

What is claimed is:

1. An aqueous textile fabric treating dispersion comprising at least two components A) and B), component A) being a compound containing two or more blocked isocyanate groups in the molecule, wherein component B) is a product obtained by reacting a diepoxy compound of the formula (I)

$$G-O-(L-O)_y-G \quad (I)$$

or a mixture of compounds of the formula (I) with a diamine or polyamine of the formula (II)

$$H_2N-(C_jH_{2j}NH)_z-H \quad (II)$$

or a mixture of compounds of the formula (II) in a proportion such that the molar ratio of the deployed glycidyl radicals G to the hydrogen atoms of the deployed amino groups is in the range from 2:1 to 1:4, and subsequently reacting the resulting reaction product with an acid in a proportion such that the ratio of moles of nitrogen to equivalents of acid is in the range from 1:0.25 to 1:2, the above radicals and indices independently of one another having the following definitions:

G is a glycidyl radical (2,3-epoxy-1-propyl radical)

L is a divalent radical of formula $(CO)_{c^1}-E_d-(CO)_{c^2}$

E is a divalent aromatic, aliphatic or araliphatic hydrocarbon radical of 1–18 carbon atoms uninterrupted or interrupted by one or more oxygen atoms $c^1$ and $c^2$ independently of one another=0 or 1 d=0 or 1 and $c^1$, $c^2$ and d are not all simultaneously 0 when y=1 j=0 or 2–10 y=0 or 1 and z=1–3; but z=1 if j=0.

2. An aqueous dispersion as claimed in claim 1, wherein the isocyanate groups of component A) have been blocked with a ketone oxime or mixture of ketone oximes.

3. An aqueous dispersion as claimed in claim 1, wherein $c^1$ and $c^2$=0 and y=1.

4. An aqueous dispersion as claimed in claim 1, wherein E is an aliphatic radical of 2–6 carbon atoms or an aromatic radical of 6–18 carbon atoms.

5. An aqueous dispersion as claimed in claim 1, wherein z=1 and j=2–6.

6. An aqueous dispersion as claimed in claim 1, wherein the acid used for the reaction of the reaction product of a diepoxy compound of the formula (I) and of a diamine or polyamine of the formula (II) with an acid is an organic acid or a strong inorganic acid.

7. An aqueous dispersion as claimed in claim 1, obtained by jointly dispersing components A) and B) and, optionally, homogenizing the resulting dispersion.

8. An aqueous dispersion as claimed in claim 1, which comprises components A) and B) in a weight ratio of from 100:2.5 to 100:30.

9. An aqueous dispersion as claimed in claim 1, further comprising one or more dispersants as component C).

10. A method for the oil, water and dirt repellent finishing of fiber materials, which comprises applying thereto an effective amount of an aqueous dispersion as claimed in claim 1.

11. An aqueous dispersion as claimed in claim 9, which comprises components A) and C) in a weight ratio of from 100:1 to 100:20.

12. An aqueous dispersion as claimed in claim 1, further comprising an oligomer, homopolymer or copolymer containing perfluoroalkyl radicals as component D).

13. An aqueous dispersion as claimed in claim 12, wherein the copolymer containing perfluoroalkyl radicals present as component D) is composed essentially of a monomer a):

a)

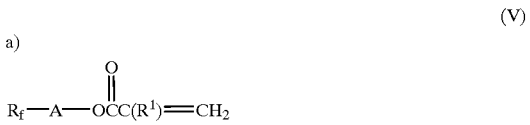

(V)

and one or more of the monomers b) and c):

b)

(VI)

c)

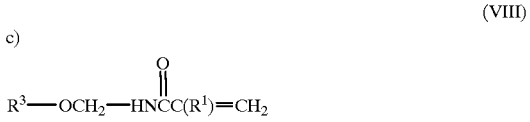

(VIII)

where the radicals and indices indicated have independently of one another the following definitions:

A is a linear or branched divalent radical of the formula $-C_nH_{2n}-$, $-C_nH_{2n-2}-$ or $-S(O_2)-NR^3-C_mH_{2m}-$, the sulfur atom being attached to $R_f$ $R_f$ is a perfluoroalkyl radical of 4–20 carbon atoms $R^1$ is a hydrogen or methyl $R^2$ is a linear alkyl or alkenyl radical of 1–24 carbon atoms $R^3$ is hydrogen or a linear or branched alkyl group of 1–6 carbon atoms m=2–4 n=1–4.

14. An aqueous dispersion as claimed in claim 12, which comprises components A) and D) in a weight ratio of 100:40 to 100:1500.

15. A process for preparing an aqueous dispersion as claimed in claim 9, which comprises jointly dispersing components A), B) and C and, optionally, homogenizing the resulting dispersion and, after the homogenization optionally adding to the dispersion an oligomer, homopolymer or copolymer containing perfluoroalkyl radicals, optionally in the form of an aqueous dispersion.

16. The method as claimed in claim 10, wherein the fiber materials comprise woven or knitted textile sheetlike structures.

17. The method as claimed in claim 10, wherein the fiber materials comprise natural or regenerated cellulose, fibers of animal origin, synthetic organic fibers, or mixtures thereof.

18. An aqueous dispersion as claimed in claim 4, wherein E is the radical p—$C_6H_4$—$(CH_3)C(CH_3)$—p—$C_6H_4$—.

19. An aqueous dispersion as claimed in claim 9, wherein the dispersion comprises at least one nonionic, cationic or pseudocationic dispersant of the formula (III) or (IV)

  (III)

  (IV)

where the radicals and indices indicated have independently of one another the following definitions:

$R^4$ is $(C_mH_{2m}O)_t$—$R^3$, $R^3$ is hydrogen or a linear or branched alkyl group of 1–6 carbon atoms, $R^5$ is a linear alkyl or alkenyl radical of 8–24 carbon atoms, $R^6$ is hydrogen, methyl or ethyl, a=0, 1 or 2, b=1 or 2, k=2–6, m=2–4, p is the valence of X, t=1–20 and X is an anion.

* * * * *